Dec. 22, 1964   H. J. WOOLSLAYER ETAL   3,162,464
TRAILER RUNNING GEAR
Filed Feb. 5, 1962   5 Sheets-Sheet 3
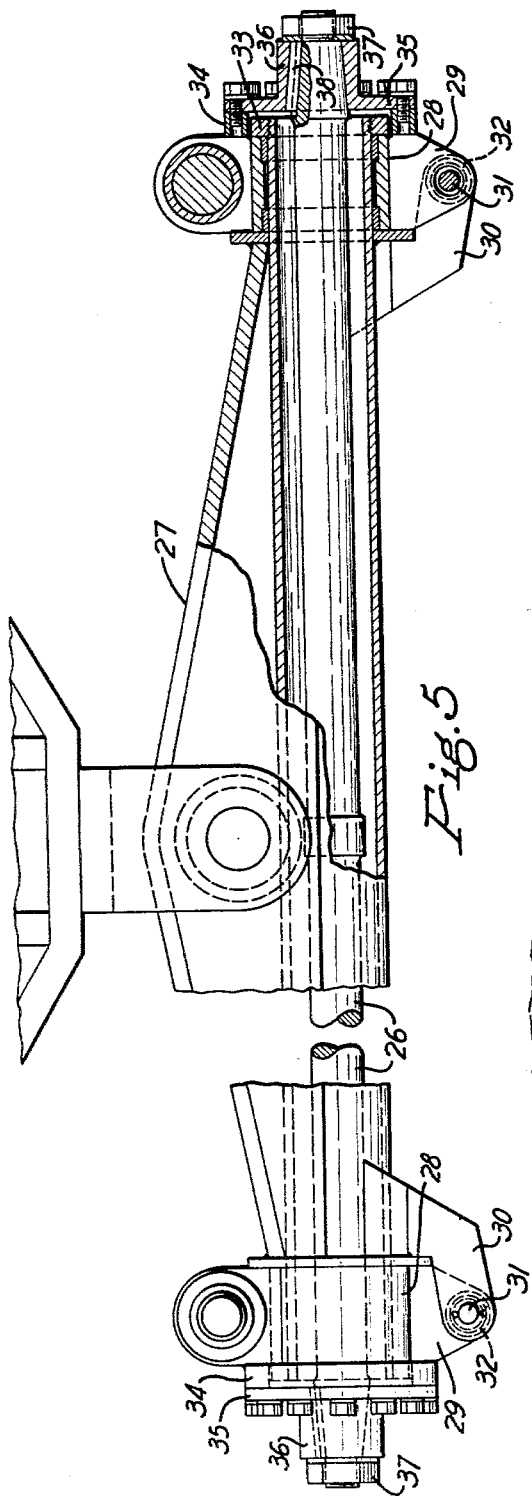
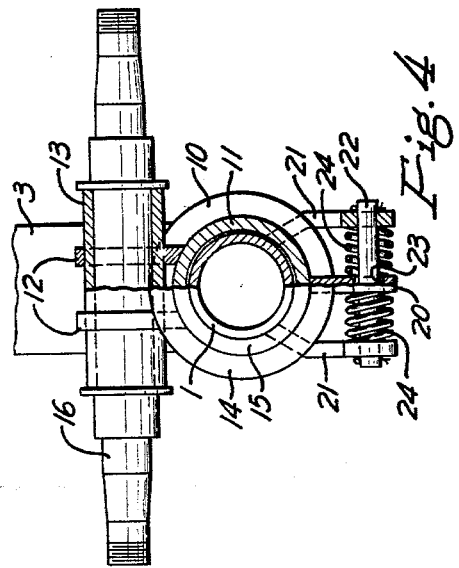
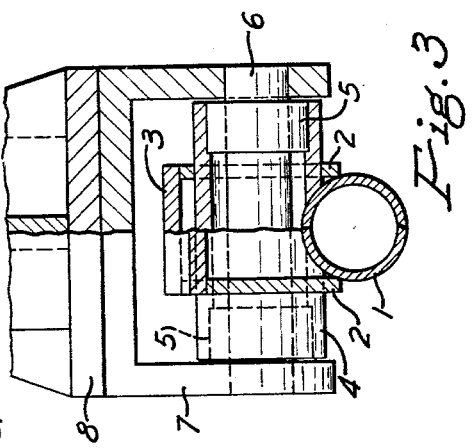
INVENTORS
HOMER J. WOOLSLAYER
CECIL JENKINS
CHARLES D. IDDINGS
BY
Brown, Critchlow, Flick & Peckham.
ATTORNEYS

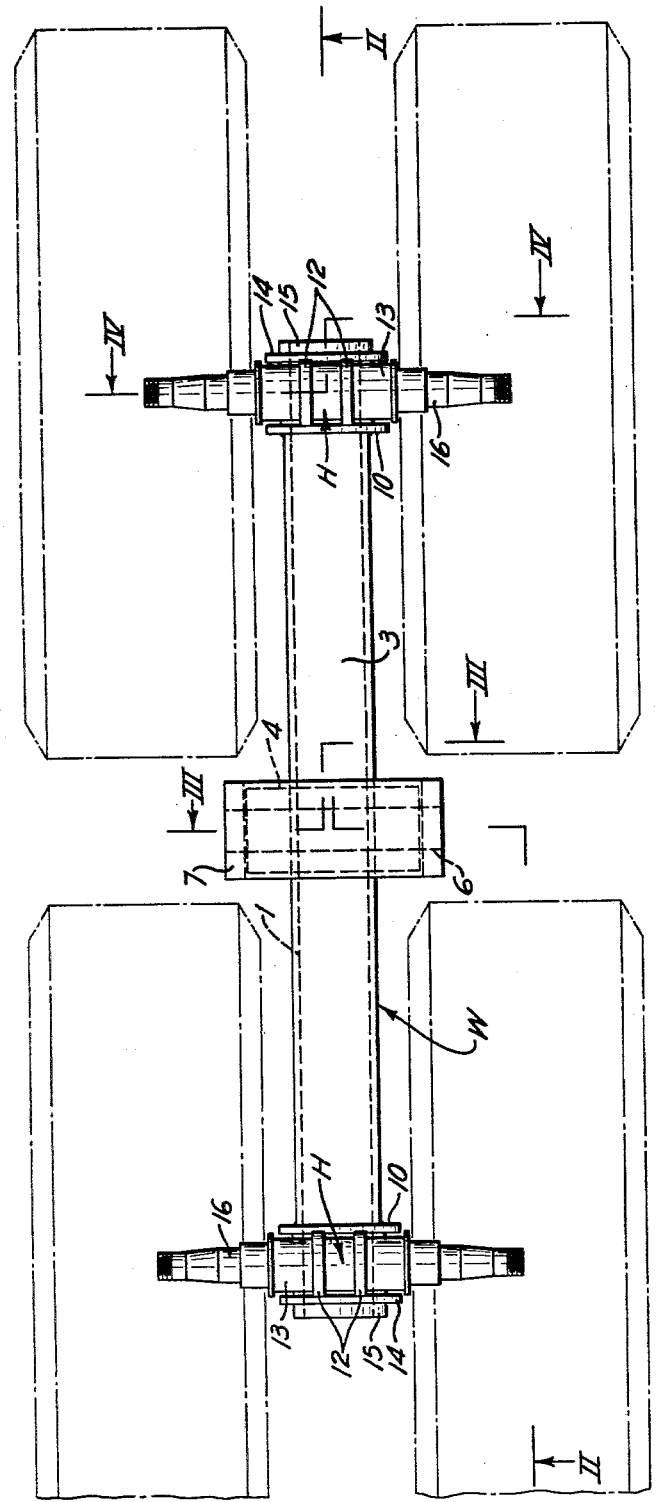

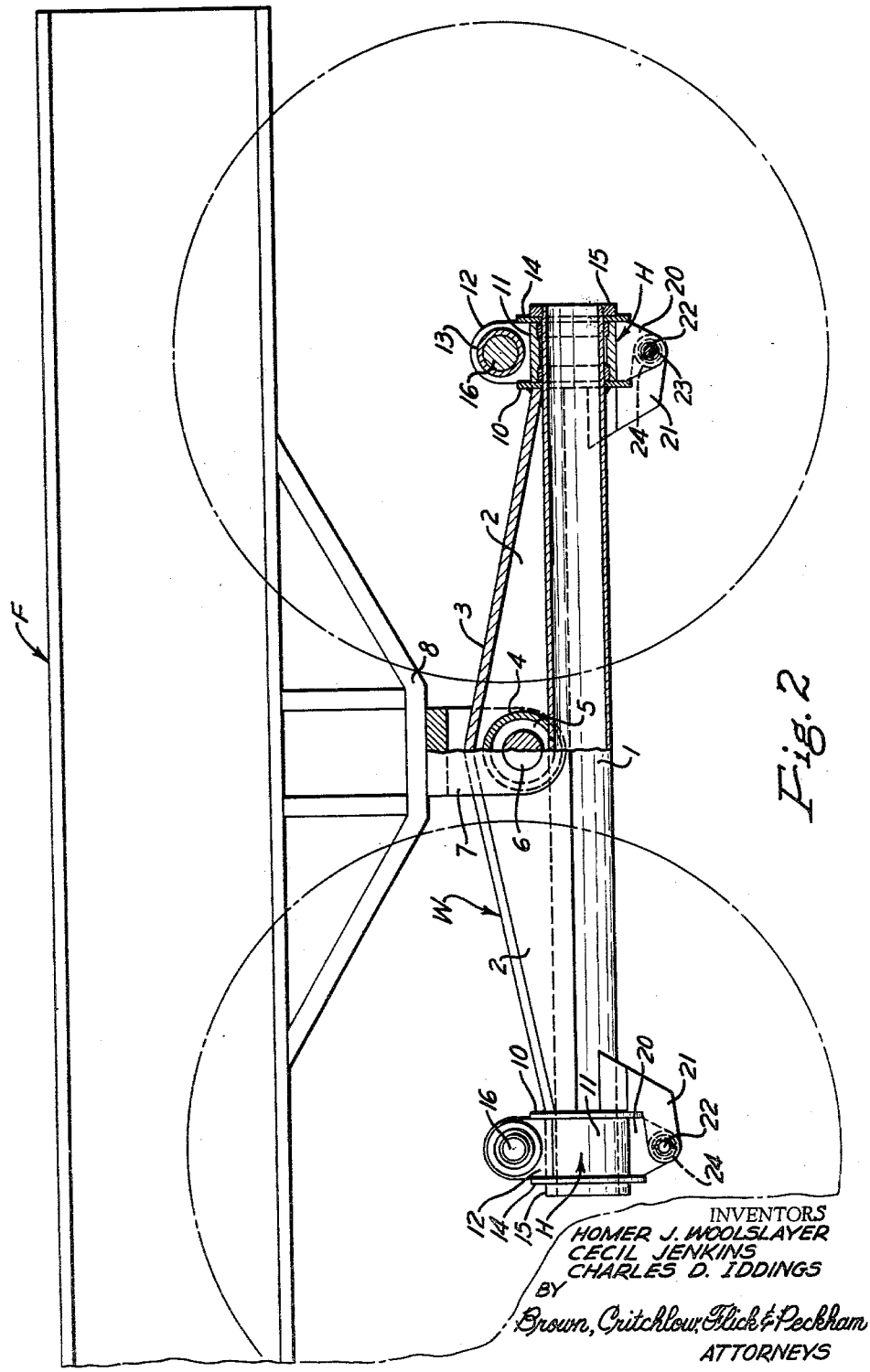

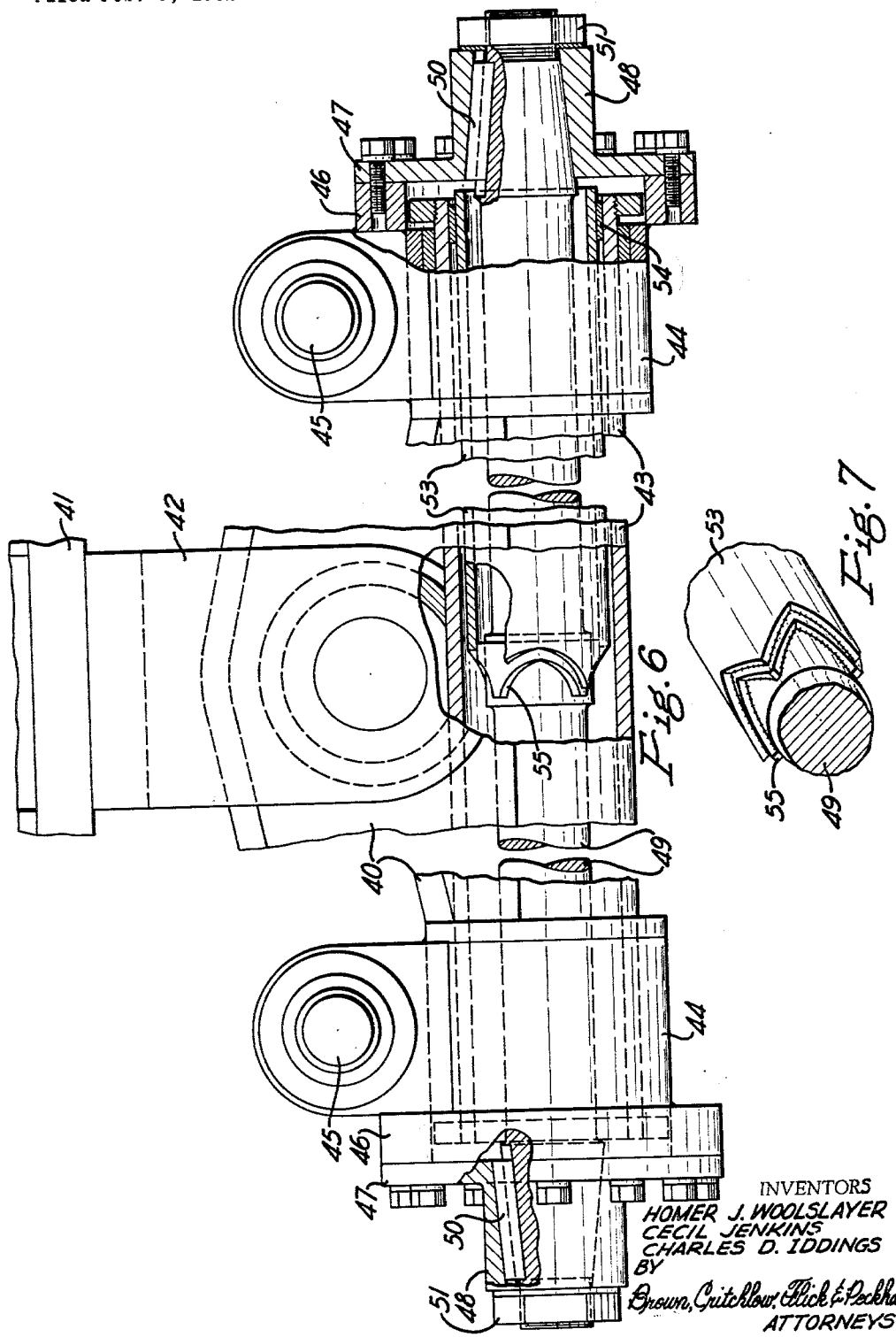

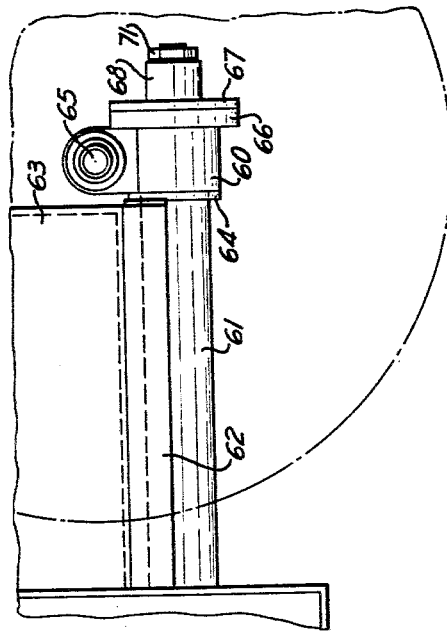
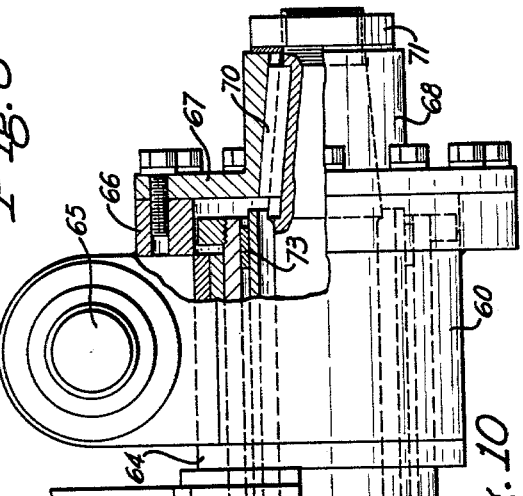
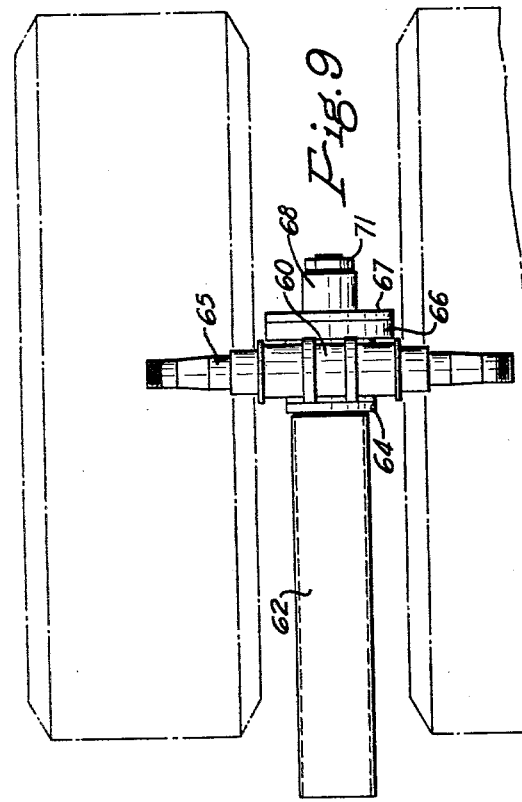
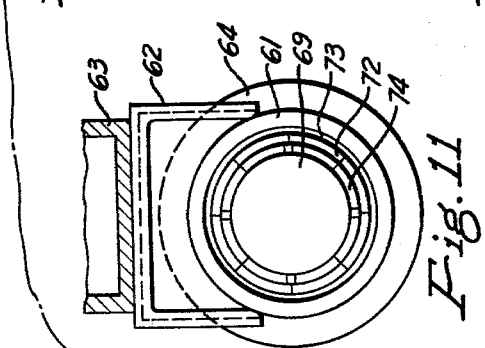

United States Patent Office 3,162,464
Patented Dec. 22, 1964

3,162,464
TRAILER RUNNING GEAR
Homer J. Woolslayer, Cecil Jenkins, and Charles D. Iddings, Tulsa, Okla., assignors to Lee C. Moore Corporation, Pittsburgh, Pa., a corporation of Pennsylvania
Filed Feb. 5, 1962, Ser. No. 170,984
2 Claims. (Cl. 280—104.5)

This invention relates to running gear for the rear ends of trailers, and more particularly to running gear in which there is at least one short axle at each side of the trailer, with a wheel on each end of the axle.

It is common practice to provide the rear ends of heavy trailers with at least two axially aligned wheels at each side of the trailer. Each pair of wheels are mounted on the opposite ends of a short axle, the central portion of which is rigidly connected to an axle housing rotatable around a trunnion that extends lengthwise of the trailer. If tandem axles are used, the trunnions are at the opposite ends of a walking beam pivotally connected to the trailer frame on a transverse axis. As the trailer travels over a road or field the axles can rock back and forth on their trunnions as one wheel or another passes over a rise or through a depression. This rocking or tilting of the axles permits the load to be distributed substantially uniformly on all of the tires. However, when the trailer is turned, the load is greatly increased on one time on each axle as that tire scuffs against the ground. At the same time, the axle may be tilted so much that the other tire carried by it will rub against the frame. These things wear the tires unduly. If the turn is quite sharp and the load great, there is even danger that the flattening and scuffing sideways of a tire may cause it to come off the wheel.

It is among the objects of this invention to provide a trailer running gear, in which free rotation of the axles around their trunnions is prevented, in which tilting of the axles on their trunnions is controlled, in which there is more equal loading of the tires on curves than heretofore, in which scuffing of the tires against the ground and trailer frame is reduced, and in which all of these things are accomplished in a relatively simple manner.

In accordance with this invention an axle housing is rotatably mounted on the trunnion of a rigid member that extends lengthwise of an overlying trailer frame, to which it is connected. An axle is secured to the housing and extends across it. The opposite ends of the axle are formed to receive wheels equipped with tires. Connected with the axle housing and its supporting member are controlled yielding means for continually resisting turning of the housing on the trunnion in either direction from a predetermined normal position. The yielding means may be springs, or a torsion member extending lengthwise of the trunnion, or both. When a walking beam is used, it may be tubular with an axle housing on each end of it and a torsion bar extending through it and rigidly connected to both housings.

The invention is illustrated in the accompanying drawings, in which

FIG. 1 is a plan view of our running gear at one side of the back of a trailer, with the tires shown in dotted lines;

FIG. 2 is a side view of the running gear, shown partly in vertical section;

FIG. 3 is a cross section taken on the line III—III of FIG. 1;

FIG. 4 is a combination end view and cross section taken on the line IV—IV of FIG. 1;

FIG. 5 is a fragmentary side view of a modification, shown partly in section;

FIG. 6 is a view similar to FIG. 5 of another embodiment of the invention;

FIG. 7 is a fragmentary perspective view of the central portion of the torsion member shown in FIG. 6;

FIGS. 8 and 9 are side and plan views, respectively, of a further embodiment of the invention;

FIG. 10 is an enlarged fragmentary side view, partly broken away in section; and FIG. 11 is an end view of the running gear taken on the line XI—XI of FIG. 10.

Referring to FIGS. 1 to 4 of the drawings, a supporting member W, which is itself rigid, extends lengthwise of the overlying trailer frame F, to which the member is connected near one side of the rear end. A similar member (not shown) supports the opposite side of the frame. The rigid member illustrated is a walking beam formed from a rigid tube 1 that is reinforced by a pair of upwardly extending parallel plates 2 welded to its opposite sides. The side plates are tapered upwardly and are covered by a top plate 3 welded to them. Extending through the centers of the two side plates is a horizontal tubular member 4, in the outer ends of which are mounted bearings 5 that receive a cross shaft 6 projecting outwardly beyond them. Rigidly mounted on the ends of this shaft is a yoke 7 that straddles the upper part of the walking beam and that is secured to the bottom of a bolster 8 projecting down from the bottom of the trailer frame.

The ends of the side plates 2 and their connecting top plate 3 are spaced a short distance from the adjacent ends of the tube 1, and each of those projecting ends of the tube is encircled by a flange 10 welded to it. The space between that flange and the adjacent end of the tube forms a trunnion, on which an axle housing H is rotatably mounted. Each housing has a sleeve-like body 11 encircling the tube, a pair of laterally spaced plates 12 that project upward in parallel planes extending lengthwise of the tube, and a tubular member 13 rigidly mounted in openings in the plates. The housings are held on the trunnions by flange rings 14 and ring nuts 15 screwed onto the tube ends. Rigidly mounted on each tubular member 13 is a short axle 16 that projects from its opposite ends for receiving a pair of rubber tired wheels. For the sake of clearness, the brakes are not shown. The walking beam allows equalization of load on the front and rear tires, which are disposed in tandem.

With the construction described thus far, which is more or less conventional, the axles would be free to rotate any amount around the walking beam. As explained above, heretofore unrestrained rocking of the axles would permit the tires to scuff excessively while the trailer was going around a corner, it would produce severe unequal deflection of the tires, and it would also create the danger of some of the tires being pulled off the wheels on sharp turns. It is a feature of this invention that these shortcomings are avoided by adding means to the running gear to yieldingly control and restrain turning of the axle housings on the walking beam without eliminating all rocking of the axles.

One way of doing this, as shown in FIGS. 2 and 4, is to connect springs between the axle housings and the walking beam. Thus, the bottom of each axle housing may be provided with a downwardly extending radial lug 20, and the tube at the opposite side of flange 10 be provided with a pair of spaced lugs 21 that extend downward and then outward along opposite sides of the housing lug, from which they normally are spaced several inches. Mounted in the two outside lugs is a rod 22 that extends through an enlarged opening 23 in the center lug. Coil springs 24 encircle this rod at opposite sides of the center lug and are compressed between it and the ouside lugs to center the lug 20 between the other two. It will be seen in FIG. 4 that this arrangement normally holds the axle horizontal, parallel to the trailer frame, but if sufficient force is applied to tilt the axle or if the trailer frame tilts laterally relative to the axle, the housing lug 20 will be swung toward one or the other of the tube lugs 21. However, such relative motion of the lugs will be strongly resisted, and thereby controlled, by one or the other of the coil springs. This will keep the load more evenly distributed on the tires at the opposite ends of the axle, which is the ultimate purpose of this invention. That will reduce scuffing and overloading of the tires, and eliminate any danger of a tire being pulled from a wheel.

In some cases where it may be felt that the coil springs may not be sufficient to control the axles to the extent desired, they can be assisted by a torsion member extending through the walking beam tube and rigidly connected to both axle housings. Such an arrangement is shown in FIG. 5, where the torsion member is a solid high strength steel bar 26 that has sufficient resilience to permit it to be twisted on its axis to some extent and to then spring back when the twisting force is removed. Wherever a torsion member is referred to herein it is presumed to be sufficiently resilient for the desired limited twisting.

In FIG. 5 the walking beam 27, the axle housings 28, the inner and outer lugs 29 and 30, the rods 31 and the coil springs 32 may all be the same as those described for the first embodiment of this invention, except that outer flanges on the beam have been omitted. Around each retaining nut 33 a bolting ring 34 is welded to the adjoining axle housing, and a flange plate 35 is bolted to the outer face of this ring. The flange plate has a central opening axially aligned with the tube, and an outwardly projecting socket 36. The inside of the socket converges away from the tube and snugly receives the tapered end of the torsion bar, which projects beyond the socket and has a threaded end on which a retaining nut 37 is screwed. The bar and inside of the two sockets are provided with key ways containing keys 38 to rigidly connect the bar and sockets together.

With this construction, in order for one axle to tilt relative to the other one, it not only must compress one of the coil springs 32, but it also must twist the torsion bar 26, whereby the tilting axle must overcome great resistance in order to rock on the walking beam. It will be seen that tilting of one axle in one direction resists rocking of the other axle in the opposite direction. Since in turning the trailer the front axle on the beam tilts in a direction opposite to the rear axle, the torsion bar can be relied on to create practically all of the resistance to such tilting if desired, in which case the coil springs between the lugs can be relatively weak and used principally for preventing unrestrained rotation of both axle housings in the same direction. In fact, in case one is concerned only with controlling and limiting rocking of the tandem axles in opposite directions relative to each other, and not with limiting their tilting in the same direction together, the coil springs and lugs could be omitted and only the torsion bar used.

An embodiment of the invention which may be preferred to those shown in FIGS. 1 to 5, because the exposed yielding means are eliminated and placed inside the walking beam, is shown in FIGS. 6 and 7. In this running gear the walking beam 40 is made in substantially the same way as in FIG. 2 and is pivotally connected to a trailer frame bolster 41 through a yoke 42. Rotatably mounted on the trunnions formed by the opposite ends of the walking beam tube 43 and axle housings 44 like those previously described, which contain short tandem axles 45. Welded to the outer end of each housing is a bolting ring 46, to which a flange plate 47 is secured. The flange plate is provided with an outwardly projecting tapered socket 48, in which one tapered end of a torsion bar 49 is rigidly mounted by means of a key 50 and a retaining nut 51.

This arrangement is substantially the same as shown in FIG. 5, but instead of coil springs for resisting turning of the torsion bar, a torsion sleeve 53 is mounted inside the walking beam. This sleeve may have substantially the same resistance to twisting as the bar. It encircles the bar and extends from one end of the walking beam tube inwardly to about the center of the bar. The sleeve is spaced from the tube and bar by an external ring 54 on the outer end of the sleeve, and an internal ring 55 in the inner end of the sleeve. The external ring is welded to both sleeve and tube, while the internal ring is welded to the sleeve and the enlarged central portion of the torsion bar. To increase the length of the latter weld, the sleeve and ring may be notched circumferentially as shown.

The bar 49 and sleeve 53 together form a torsion member. If one axle tilts in one direction from its normal position and the other axle tilts an equal amount in the opposite direction, the torsion bar will be twisted but the sleeve will not be affected because the center of the bar will not turn. However, if one axle tilts more than the other, then the sleeve likewise will be twisted and will help the torsion bar resist the tilting of the axles. The sleeve also restrains rotation of the torsion bar in the walking beam both axles attempt to rock in the same direction, such as when the trailer is travelling along a road with a high crown. If desired, the sleeve can be made in the form of a coil spring encircling the torsion bar in the same way. This embodiment of the invention also has the advantage that all of the yielding means for continually resisting turning of the axle housings on the walking beam are concealed and protected by the walking beam.

The modification shown in the last four figures of the drawings is for use when tandem wheels are not employed. In this case the support for the single axle housing 60 at each side of the trailer is a relatively short horizontal tube 61 extending lengthwise of the trailer. A channel 62 may be welded to the top of the tube for the double purpose of reinforcing the tube and forming a flat surface on which a bolster 63 under the overlying trailer frame can be secured. Of course, the channel also keeps the tube from turning on its axis. Near its outer or rear end the tube is encircled by a flange 64, between which and the end of the tube the tube forms a trunnion for the axle housing. A short axle 65 is mounted in the housing and has opposite ends for receiving rubber tired wheels. As in FIGS. 5 and 6, a bolting ring 66 is welded to the outer end of the housing so that a flange plate 67 can be attached to it. The tapered socket 68 projecting from the flange plate receives the tapered outer end of a torsion bar 69 held rigidly in the socket by a key 70 and a nut 71 on the end of the bar. This bar may be only about half as long as the ones previously described, but its effective length and flexibility are increased by a torsion sleeve 72 encircling the bar within the tube. The outer end of the sleeve is welded to the tube through an exterior spacing ring 73 while the inner end of the sleeve is welded to a spacing ring 74 welded to the enlarged inner end of the torsion bar. The torsion member formed by the sleeve and bar is completely concealed and protected by the tube. It strongly resists rocking of the axle on the tube, and therefore this construction has the same advantages as the others described herein.

By using running gear such as disclosed herein, tire wear and the possibility of accidents resulting from serious unequal tire deflection can be reduced.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A trailer running gear comprising a walking beam adapted to extend lengthwise of an overlying trailer frame and including a longitudinal rigid tube and means midway between the ends thereof for pivotally connecting it to such a frame on a transevrse axis, an axle housing encircling each end of the tube and rotatably mounted thereon, an axle secured to each housing and extending across the tube, the opposite ends of each axle being formed to receive wheels, a torsion member rotatably disposed in said tube and projecting from its ends, and means rigidly connecting the ends of said member with the adjoining axle housings whereby longitudinal tilting of either axle relative to the other one will be resisted by the resistance of the torsion member to twisting.

2. A trailer running gear comprising a walking beam adapted to extend lengthwise of an overlying trailer frame and including a longitudinal rigid tube and means midway between the ends thereof for pivotally connecting it to such a frame on a transverse axis, an axle housing encircling each end of the tube and rotatably mounted thereon, an axle secured to each housing and extending across the tube, the opposite ends of each axle being formed to receive wheels, a torsion bar rotatably disposed in said tube and projecting from its ends, a cylindrical torsion member in the tube encircling said bar and extending from one end of the tube inwardly to the central part of the bar, means rigidly connecting the outer end of said member to the tube, means rigidly connecting the inner end of said member to the bar, and means rigidly connecting the ends of the bar with the adjoining axle housings.

References Cited in the file of this patent

UNITED STATES PATENTS

| | | |
|---|---|---|
| 2,121,862 | Dodge | June 28, 1938 |
| 2,238,002 | Pointer | Apr. 8, 1941 |
| 2,919,928 | Hoffer | Jan. 5, 1960 |

FOREIGN PATENTS

| | | |
|---|---|---|
| 321,257 | Italy | Sept. 28, 1934 |

UNITED STATES PATENT OFFICE
CERTIFICATE OF CORRECTION

Patent No. 3,162,464            December 22, 1964

Homer J. Woolslayer et al.

It is hereby certified that error appears in the above numbered patent requiring correction and that the said Letters Patent should read as corrected below.

Column 1, line 27, for "time" read -- tire --; column 2, line 38, for "on" read -- in --; column 3, line 67, for "and" read -- are --; column 4, line 24, after "beam" insert -- when --; column 5, line 4, for "transevrse" read -- transverse --.

Signed and sealed this 27th day of April 1965.

(SEAL)
Attest:

ERNEST W. SWIDER
Attesting Officer

EDWARD J. BRENNER
Commissioner of Patents